United States Patent [19]

Bara

[11] 3,924,269

[45] Dec. 2, 1975

[54] UNITARY POSITIONING ARM FOR SIDE DRIVE OF A CARTRIDGE TAPE PLAYER SYSTEM HAVING A REVERSE AND FAST FORWARD CAPABILITY

[75] Inventor: Edwin Stanley Bara, Chicago, Ill.

[73] Assignee: Motorola, Inc., Chicago, Ill.

[22] Filed: Aug. 5, 1974

[21] Appl. No.: 494,576

[52] U.S. Cl. .............. 360/93; 242/55.19 A; 360/73

[51] Int. Cl.[2] ..................... G11B 15/00; B65H 17/48

[58] Field of Search .......... 360/93, 73; 242/55.19 A

[56] References Cited

UNITED STATES PATENTS

| | | | |
|---|---|---|---|
| 3,410,497 | 11/1968 | Lopez-Henriquez | 360/73 |
| 3,462,055 | 8/1969 | Trott | 242/55.19 A |
| 3,471,096 | 10/1969 | Hancock | 360/93 |
| 3,627,418 | 12/1971 | Prigozy | 360/73 |
| 3,632,894 | 1/1972 | Bretschneider et al. | 360/73 |
| 3,648,225 | 4/1972 | Lace | 242/55.19 A |
| 3,698,723 | 10/1972 | Kobler et al. | 360/93 |

*Primary Examiner*—Daryl W. Cook

*Attorney, Agent, or Firm*—James W. Gillman; Donald J. Lisa

[57] ABSTRACT

An 8-track tape cartridge is normally adapted to be driven forwardly at a first speed in the playback mode by means of a coupling arrangement between the capstan and the tape effected through an access opening in the front wall of the cartridge housing. The cartridge is also provided with an access opening in the side wall of the cartridge and a rotatable idler wheel pivotably mounted in the cartridge to effect a coupling relationship to the rim of the hub on which the tape is wound to drive the tape through the cartridge at a second higher speed in a reverse or fast forward mode of operation. The idler wheel is responsive to movement of a side drive coupling means mounted in the player which includes a single positioning arm pivotably mounted in the tape player housing and which couples the player drive motor to the hub through the side access opening in response to operation of an actuating means including a reverse slide and a fast forward slide. Optional tape guide means is provided to assist in guiding the tape onto the cartridge hub in the rewind mode wherein the tape is removed from the hub at the outer convolution and returned to the hub at the inner convolution.

13 Claims, 2 Drawing Figures

UNITARY POSITIONING ARM FOR SIDE DRIVE OF A CARTRIDGE TAPE PLAYER SYSTEM HAVING A REVERSE AND FAST FORWARD CAPABILITY

BACKGROUND

This invention relates to magnetic tape player drive mechanisms and, particularly, to a cartridge tape player system suitable for use in automobiles.

Although cartridge tape player systems have been on the market for a number of years and have been popular with the public since their introduction, still they have suffered from a major disadvantage in relation to reel to reel systems and cassette systems in that, until recently, cartridge tape player systems did not have a reverse capability. In order to move the tape to a preselected point for listening and recording, it was necessary to wind the tape in a forward direction until the preselected point was reached. Users found this procedure objectionable particularly when it would have been convenient to simply reverse wind the cartridge a short distance to get to the preselected point such as immediately after a recording error was made by the operator while making a recording. Accordingly, in the player-recorder market, reel to reel and cassette systems have been far more successful than cartridge tape player-recorder systems.

In my copending application for a Cartridge Tape Player System Having Reverse And Fast Forward Modes Of Operation, Ser. No. 379,293, filed July 16, 1973 now U.S. Pat. No. 3,894,699 issued July 15, 1975 and assigned to the same assignee as is assigned the present application, I disclosed a new reversible cartridge tape player system which will make cartridge tape players with record capabilities more appealing. However, the system therein disclosed was particularly adapted for use in the home.

Tape players which have been built for use in automobiles must additionally satisfy the requirement for compactness and thinness primarily because of the premium on available space in automobile dashboards. Accordingly, a recent proposal has been made for a thin cartridge tape player system which has a side drive mechanism and is adapted for use in automobiles. The system, which is disclosed in copending application Ser. No. 491,431 filed Aug. 5, 1974 entitled "Reversible Cartridge Tape Player System With Side Drive" by Melvin Lace and Fernand Pelletier, nicely accomodates the principle of compactness and thinness which is required for automobile cartridge tape players. It also has a reverse and fast forward capability. However, the particular drive mechanism disclosed is rather complex and costly.

The present invention is an improvement upon the aforesaid systems and provides a simple low cost drive mechanism for cartridge tape players which are side driven in a reverse or fast forward mode of operation.

SUMMARY OF THE INVENTION

Accordingly, the present invention has as its objects to provide:

1. An improved tape player drive mechanism for side driven tape cartridges.
2. A simplified coupling mechanism to connect the player drive motor to the cartridge hub to drive the tape through the cartridge in either a fast forward or fast rewind mode of operation.

3. An improved cartridge tape player system in which the side drive of the player is laterally moved into coupled relation with the rim of the hub of the tape through an access opening in the cartridge side wall.

Briefly the present invention is adapted for use with a continuous loop cartridge which has a housing and front and side walls which have access openings. The cartridge includes a hub which is rotatably mounted in the housing and a continuous loop tape wound on the hub and adapted for being driven through the cartridge in a forward direction by being removed from the hub at the inner convolution and returned to the hub at the outer convolution. The tape player of the present invention includes a housing which has a cavity dimensioned to receive the cartridge and tape playing and driving instrumentalities which include a capstan drive shaft mounted on the player housing in communication with the cavity and adapted for coupling to the tape through the access opening in the front wall of the cartridge housing to drive the tape through the cartridge in the forward direction at a first velocity when the tape cartridge is fully inserted in the cavity during a normal playback mode of operation of the player. The player further includes a drive motor and a coupling means to connect the drive motor to the cartridge hub through the access opening in the side wall of the cartridge to drive the tape through the cartridge at a second velocity higher than the first velocity and means to actuate the coupling means.

The coupling means specifically includes a unitary positioning arm which is pivotably mounted within the player housing and which is movable to place a coupling member rotatably mounted to the positioning arm into coupled relation with the hub in response to movement of the actuating means to either a reverse or fast forward mode of operation.

Additional features and objects of the invention will be apparent from the description of the drawings and the preferred embodiments which follow.

DESCRIPTION OF THE PREFERRED EMBODIMENT

Figure 1:
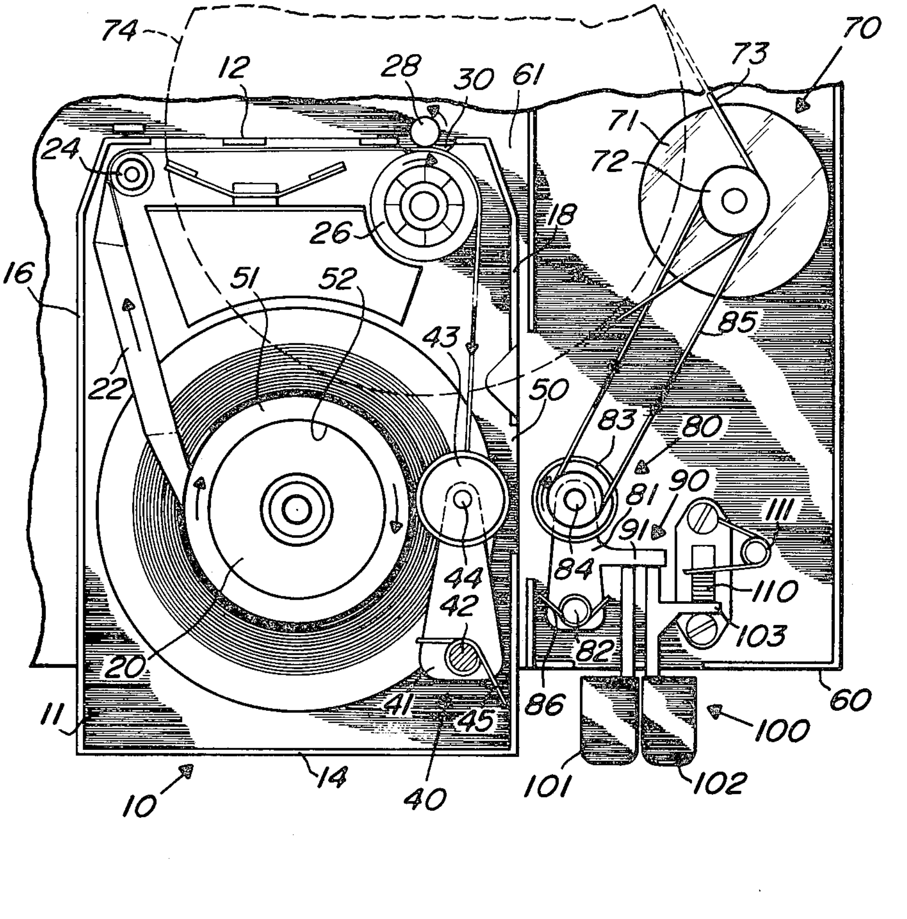
FIG. 1 is a plan view in partial section of the cartridge tape player system of the present invention showing the normal playback mode of operation.

Referring now to the drawings in greater detail wherein like numerals have been employed in both views to designate similar components, there is shown a continuous loop cartridge 10 which has an upstanding front wall 12 an upstanding rear wall 14 and upstanding side walls 16, 18. Hub means 20 is rotatably mounted to base member 11. A continuous loop tape 22 is wound on hub 20 and extends from the inner periphery of hub 20 around roller 24 and pressure wheel 26 returning to the hub 20 at the outer convolution of tape wound on the hub. The tape is adapted to be driven through the cartridge in a forward direction by capstan drive shaft 28 which is mounted in the housing of the tape player in communication with a cartridge receiving cavity of the tape player which is dimensioned to receive the tape cartridge or casing 10. The capstan is coupled to the tape through the access opening 30 in the front wall of casing 10 in order to drive the tape through the cartridge in the forward direction at a first velocity, as described in greater detail below, when the tape cartridge is fully inserted in the cavity during a normal playback mode of operation of the player. When the tape is driven through the cartridge in the forward direction, it is removed from the hub 20 at the inner convolution and is returned to the hub at the outer convolution.

Cartridge 10 further includes an idler wheel assembly 40 which includes arm 41 pivotably mounted at one end to the cover (not shown) by shaft 42. Idler wheel 43 is mounted to a shaft 44 at the other end of pivot arm 41. A torsion spring 45 has one end secured at the side wall 18 and the other end secured to the pivot arm 41 in order to bias the idler wheel 43 clockwise as shown in FIG. 1. Access opening 50 is located in the side wall 18 of casing 10. The idler wheel 43 is pivotable between a first position disengaged from the hub 20, which is the position shown in FIG. 1, and a second position wherein the wheel 43 is coupled to the hub 20, which is the position shown in FIG. 2, in that wheel 43 is so dimensioned that it is brought into contact with a laterally extended rim portion 51 which is, in effect, an extension of the upstanding wall portion 52 of the hub 20. Rim portion 51 extends a predetermined distance over the tops of the convolutions of tape wound on the hub 20, and the upstanding wall portion 52 extends a predetermined distance from the axis of rotation of the hub 20 so that the coupled relation can be effected. The idler wheel 43 is moved from the first to the second position in response to movement of a positioning arm described in greater detail below. When the positioning arm is removed from its coupled relation with idler wheel 43, the biasing means 45 returns the idler wheel to its first position.

Also shown in FIG. 1 is tape player 60 which has a cartridge receiving cavity 61 dimensioned to receive the casing of cartridge 10. When cartridge 10 is fully inserted within cavity 61, capstan 28 is in contact with the tape 22 disposed over pressure wheel 26 for driving the tape in a forwardly direction through the cartridge. Capstan 28 receives its rotative force from drive means 70 mounted within the player and which includes a drive motor 71, a drive pulley wheel 72 driven by the motor 71, a belt 73 connecting pulley 72 and flywheel 74, the capstan 28 being mounted on a common shaft with flywheel 74 and being driven therewith.

The tape player also includes a coupling means 80 which is mounted in the housing for coupling the drive means 70 to the cartridge hub 20 through the access opening 50 in the side wall of casing 10 for driving the tape through the cartridge in either a reverse or fast forward direction and at a second velocity higher than the first velocity which is the velocity of the tape driven through the cartridge in the forwardly direction by capstan 28. The coupling means includes a unitary positioning arm 81 which is pivotably mounted in the housing at one end by shaft 82. The positioning arm 81 is a flat member and has rotatably mounted to its other end a coupling member 83, such as a wheel, which rotates about shaft 84. The coupling member 83 is connected to the drive means 70 by resilient belt 85 and is continuously driven. Positioning arm 81 also has a cooperable means which comprises a pickup arm 91 extending laterally from the side of the positioning arm 81 and which is cooperable with an actuating means 100, described in greater detail below, for moving the positioning arm from a first position disengaged from the hub, as shown in FIG. 1, to a second position coupled to the hub 20 as shown in FIG. 2.

Figure 2:
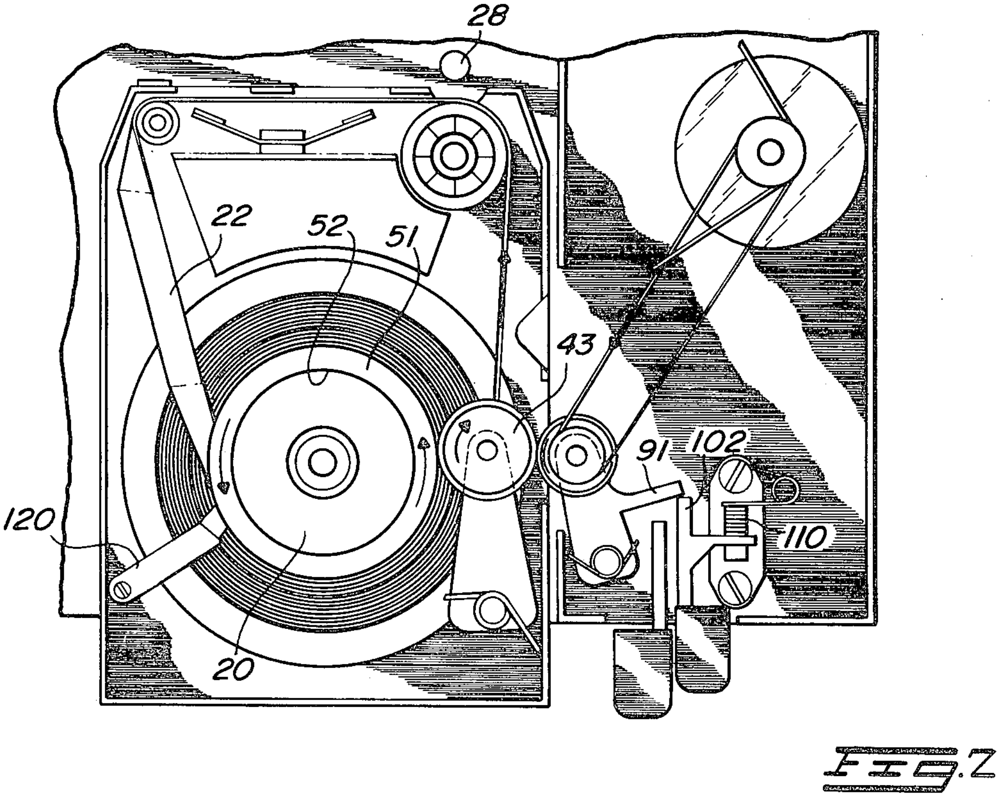
FIG. 2 is a plan view in partial section similar to FIG. 1 showing the reverse mode of operation.

When the actuating means is operated, the pickup arm 91 is contacted and the positioning arm 90 is rotated counterclockwise as shown in FIG. 1 to move the coupling member 83 from its first position as shown in FIG. 1 to its second position as shown in FIG. 2 in coupled relation with the idler wheel 43 which in turn is moved from its first position as shown in FIG. 1 to its second position as shown in FIG. 2 in coupled relation with the extended rim portion 51 of the hub 20 whereby the rotative force of the drive motor is applied to the hub through the access opening 50 in the casing side wall to drive the tape through the cartridge in a forwardly or reverse direction as desired. Belt 85 stretches slightly to accommodate the aforesaid movement of coupling member 83.

The coupling means 80 includes a torsion spring 86 which has one end mounted to the housing and the other end mounted to the positioning arm 81 and which biases positioning arm 81 to the first position disengaged from the idler wheel 43 of the cartridge.

The actuating means 100 includes two slide means 101 and 102 mounted in the housing for independent sliding movement, as is well known in the art, between a first released position as shown in FIG. 1 and a second depressed position as shown in FIG. 2 (as to slide 102). The first slide means 101 when it is depressed contacts pickup arm 91 to move the positioning arm from the first to the second position and will drive the tape in one direction. The second slide means 102 when it is depressed will also contact pickup arm 91 and rotate positioning arm 81 into coupled relation with the hub to drive the tape in the opposite direction. In order to reverse the direction of rotation of the wheel 83 when slide 102 is depressed, the player is provided with a switch means 110 which is biased in one direction by spring 111 and which is actuated by pickup arm portion 103 of slide 102. Portion 103 is a laterally extending portion from the side of the slide 102. When slide 102 is depressed pickup arm 103 which is cooperable with switch 110 moves the switch from a first to a second position to reverse the direction of rotation of the player drive motor 71 so that wheel 83 is driven in the direction opposite from the direction in which it is driven when slide 101 is depressed. When the actuated slide 101, 102 is released, the positioning arm is returned to its first position under the action of the biasing member 86 which also will return the slide 101, 102 to its initial outward position.

It is to be noted that the dimension of the wheel 83 is such that when it is moved to the second position by slides 101, 102 it is large enough to contact wheel 43 and move it into coupled relation with the hub 51. As shown in FIGS. 9 and 9A of copending application Ser. No. 491,431 referred to supra, the presence of idler wheel 43 in the cartridge is not absolutely essential to practice the present invention since coupling member 83 may be dimensioned for movement into direct contact with the extended rim portion 51 of hub 20 for driving the same forwardly or in reverse.

Also, the cartridge 10 is optionally provided with a guide finger 120 which is secured to the base 11 of the casing and which guides the tape 22 downwardly under the rim 51 and onto the upstanding wall portion 52 of the hub when the tape is driven in the reverse direction. However, the finger 120 is not essential to the operation of the tape in the reverse direction in that the upstanding wall 52 and the flange 51 can be so shaped to act as the guide to assist the tape 22 to be returned to the hub at the inner convolution without riding up and over the edge of the rim 51 and without jamming.

The present invention is suitable for use in the Cartridge Tape Player System Having Reverse And Fast Forward Modes Of Operation disclosed in my copending application Ser. No. 379,293 filed July 16, 1973 the entire disclosure of which is incorporated by reference herein.

In the tape player system of the present invention, the basic elements of a standard cartridge tape player system and of the reversible cartridge tape player system described in my aforesaid copending application are retained. Only the modifications described herein are made to the standard system and to my reversible system to provide the highly desirable simplified side drive of the present invention.

The minor changes that would be necessary to be made to adapt the system of my aforesaid copending application to be compatible with the side drive of the present invention is within the skill of one skilled in the art.

For example, as shown in FIG. 2 when slide 102 is depressed to drive the tape in one direction through the cartridge by coupling to the member 51 through the side opening 50 of the cartridge 10, the cartridge is moved rearwardly a short distance in the cavity 61 such that the capstan 28 is disengaged from its coupled relationship with the tape through the forward access opening 30. The means for disabling the capstan as a forward drive means upon actuation of the slide 102 is not shown in FIG. 2 but a workable mechanism is fully disclosed in my aforesaid copending application and could be easily adapted for use herein by one skilled in the art. The same means works and applies for the same function to accomplish the same purpose when the slide 101 is also depressed.

Similarly, the cartridge 10 which is used with the player of the present invention has a wire expandible ring (not shown) mounted in the cartridge which ring encircles the outer convolution of tape, squeezes the tape inwardly toward the hub and biases the tape convolutions toward the side of the hub wall 52 away from the point where the tape is returned to hub wall. The ring is selectively expandible between a first expanded position disengaged from the outer convolution of tape, and a second contracted position engaging the outer convolution of tape and means (not shown) are provided to selectively activate the ring to the first position in the playback and fast forward modes of operation and to the second position in the reverse mode of operation. The ring when closed puts a frictional drag on the outermost convolution of tape and restricts the tendency of the entirety of tape convolutions to grow outwardly. Good frictional contact is thereby maintained between the hub wall 52 and the innermost tape convolutions to draw the tape into the hub in reverse. The foregoing mechanisms are fully disclosed in my aforesaid copending application and could be easily adapted to perform identical functions herein by one skilled in the art.

Similarly the cartridge 10 which is used with the player of the present invention has a one way clutch (not shown) mounted in the cartridge which couples the hub to the platen, on which the wound tape is sitting, so that the hub and platen rotate together in the fast forward mode of operation but rotate independently of each other in the reverse mode of operation. Such a clutch is fully disclosed in my copending application.

While a particular embodiment of the invention has been shown and described, it should be understood that the invention is not limited thereto since many modifications may be made. It is therefore contemplated to cover by the present application any and all such modifications as fall within the true spirit and scope of the appended claims. For example, it is not necessary to drive the coupling means 80 by a belt 85 connected directly with the drive motor 71. Instead the belt may be applied to the capstan 28 directly or to a pulley mounted on the capstan shaft, for example, to derive a drive force for coupling means 80. One skilled in the art would be able to determine appropriate gear ratios to drive the tape at an appropriate speed much higher than in the playback mode.

Similarly, it is not necessary to have the reversing switch means 110. Instead, a motor 71 may be pivotably mounted in the player housing in coupled relation with the member 83, and a means may be provided for interposing an idler wheel into a coupled relation between such a motor and the wheel 83 to achieve reverse action.

Similar additional modifications are possible.

I claim:

1. A cartridge tape player for a continuous loop cartridge having a casing having a first wall and a second wall and having an access opening in each of the walls, a hub means rotatably mounted in the casing, and a continuous loop tape wound on the hub means and adapted for being driven through the cartridge in a forward direction by being removed from the hub means at the inner convolution and returned to the hub means at the outer convolution, wherein the tape player comprises a housing having a cartridge receiving cavity therein dimensioned to receive the casing, tape playing and driving instrumentalities including a capstan drive shaft mounted on the housing in communication with the cavity and adapted for coupling to the tape through the access opening in the first wall of the casing to drive the tape through the cartridge when the tape cartridge is fully inserted in the cavity during a first mode of operation of the player, drive means mounted in the housing, means mounted in the housing for coupling the drive means to the cartridge hub means through the access opening in the second wall of the casing for driving the tape through the cartridge during a second mode of operation during which the capstan drive shaft is uncoupled from the tape, means mounted in the housing for actuating the coupling means, the coupling means including a unitary positioning arm having one end pivotably mounted in the housing, a coupling member rotatably mounted to the other end of the positioning arm, the positioning arm being movable between a first position in which the coupling member is disengaged from the hub means and a second position in which the coupling member is coupled to the hub means, and means on the positioning arm cooperable with the actuating means for moving the positioning arm from the first to the second position, whereby when the positioning arm is moved to the second position the tape is driven through the cartridge through the access opening in the casing side wall.

2. The cartridge tape player as claimed in claim 1 wherein the cooperable means is a pick up arm extending laterally from the side of the positioning arm whereby when the actuating means is operated, the pickup arm is movable to position the positioning arm in the second position.

3. The cartridge tape player as claimed in claim 2 further comprising biasing means mounted in the player between the housing and the positioning arm to bias the positioning arm into the first position when the actuating means is released.

4. The cartridge tape player as claimed in claim 1 wherein the first and second walls are a front and a side wall respectively, the first and second modes of operation are a normal playback and a fast winding mode respectively, the tape being driven in the fast winding mode at a velocity greater than in the normal playback mode.

5. The cartridge tape player as claimed in claim 4 wherein the coupling member is a continuously driven wheel.

6. A reversible cartridge tape player for a reversible continuous loop cartridge having a casing having a front wall and a side wall and having an access opening in each of the walls, a hub means rotatably mounted in the casing, and a continuous loop tape wound on the hub means and adapted for being driven through the cartridge in a forward direction by being removed from the hub means at the inner convolution and returned to the hub means at the outer convolution, wherein the tape player comprises a housing having a cartridge receiving cavity therein dimensioned to receive the casing, tape playing and driving instrumentalities including a capstan drive shaft mounted on the housing in communication with the cavity and adapted for coupling to the tape through the access opening in the front wall of the casing to drive the tape through the cartridge in the forward direction at a first velocity when the tape cartridge is fully inserted in the cavity during a normal playback mode of operation of the player, drive means mounted in the housing, means mounted in the housing for coupling the drive means to the cartridge hub means through the access opening in the side wall of the casing for driving the tape through the cartridge in a reverse direction at a second velocity higher that the first velocity during a fast winding mode of operation during which the capstan drive shaft is uncoupled from the tape, means mounted in the housing for actuating the coupling means, the coupling means including a unitary positioning arm having one end pivotably mounted in the housing, a coupling member rotatably mounted to the other end of the positioning arm, the positioning arm being movable between a first position in which the coupling member is disengaged from the hub means and a second position in which the coupling member is coupled to the hub means, and means on the positioning arm cooperable with the actuating means for moving the positioning arm from the first to the second position, whereby when the positioning arm is moved to the second position the tape is driven through the cartridge through the access opening in the casing side wall.

7. The reversible cartridge tape player as claimed in claim 6 wherein the cooperable means is a pickup arm extending laterally from the side of the positioning arm whereby when the actuating means is operated, the pickup arm is movable to position the positioning arm in the second position.

8. The reversible cartridge tape player as claimed in claim 7 further comprising biasing means mounted in the player between the housing and the positioning arm to bias the positioning arm into the first position when the actuating means is released.

9. The reversible cartridge tape player as claimed in claim 8 further adapted for use in a cartridge tape player system having a fast forward mode of operation wherein the actuating means comprises a first slide means slideably mounted in the housing for actuating the positioning arm to drive the tape in the reverse direction, and a second slide means slideably mounted in the housing for actuating the positioning arm to drive the tape in the fast forward direction actuation of either the first or the second slide contacting the pickup arm to move the positioning arm to the second position, the positioning arm returning to the first position upon the release of the slides under the action of the biasing member whereby when the tape is driven through the cartridge in a reverse direction during a rewind mode of operation, the tape is removed from the hub means at the outer convolution and returned to the hub means at the inner convolution.

10. The reversible cartridge tape player as claimed in claim 9 wherein the first and second slides are each independently slideable from a released position disengaged from the pickup arm to an engaged position in contact with the pickup arm in response to a force applied by the operator and are returnable to the release position under the force of the biasing member.

11. The reversible cartridge tape player as claimed in claim 9 wherein one of the slide means includes reversing means cooperable with the one slide for reversing the direction of rotation of the rotatable member when the one slide is moved to the engaged position.

12. The reversible cartridge tape player as claimed in claim 11 wherein the reversing means comprises a pickup arm laterally extending from the side of the one slide, A switch movable from a first to a second position for reversing the direction of rotation of the player drive motor biasing means mounted between the housing and the switch for biasing the switch to the first position the pickup arm cooperable with the switch to move the switch from the first to the second position in response to actuation of the one slide whereby upon actuation of the one slide the tape is driven through the cartridge in a direction opposite the direction in which the tape is driven upon actuation of the other slide.

13. The reversible cartridge tape player as claimed in aim 6 wherein the cartridge includes the hub means having an upstanding wall portion spaced a predetermined distance from the axis of rotation of the hub means onto which the inner convolution of tape is wound, an idler wheel rotatably mounted within the casing and pivotable between a first position disengaged from the upstanding wall portion and a second position coupled to the upstanding wall portion, and means mounted in the casing to bias the idler wheel to the first position wherein the tape player further comprises, the rotatable coupling member dimensioned for being coupled to the idler wheel to move the idler wheel to the second position.

* * * * *